United States Patent [19]

Reid

[11] Patent Number: 5,253,706

[45] Date of Patent: Oct. 19, 1993

[54] RELEASE MECHANISM

[75] Inventor: Michael A. Reid, Aberdeen, Great Britain

[73] Assignee: Well-Equip Limited, Aberdeen, Scotland

[21] Appl. No.: 813,816

[22] Filed: Dec. 26, 1991

[30] Foreign Application Priority Data

Dec. 29, 1990 [GB] United Kingdom ............... 9028185

[51] Int. Cl.$^5$ ...................... B25J 17/00; E21B 33/12; E21B 34/16

[52] U.S. Cl. .................................. 166/135; 166/142; 166/338; 166/385; 403/316; 403/322

[58] Field of Search ............... 166/135, 125, 181, 338, 166/340, 342, 385, 169, 142; 403/316, 317, 322; 285/85, 86, 316

[56] References Cited

U.S. PATENT DOCUMENTS

| | | | |
|---|---|---|---|
| 3,670,815 | 6/1972 | Brown | 166/125 X |
| 3,863,715 | 2/1975 | Yonker | 166/125 X |
| 4,405,017 | 9/1983 | Allen et al. | 166/125 X |
| 4,452,418 | 2/1984 | Moyland | 166/133 |
| 4,474,242 | 10/1984 | Upchurch | 166/323 |
| 4,479,539 | 10/1984 | Tamplen et al. | 166/212 |
| 4,657,077 | 4/1987 | Smith, Jr. et al. | 166/125 X |
| 4,957,387 | 9/1990 | Nasu | 403/322 |

Primary Examiner—Stephen J. Novosad

[57] ABSTRACT

A release mechanism is described for releasing a lock member (10) which secures a first body member (5) to a second body member (1). The release mechanism comprises a reciprocal member (6) which is mounted on the first body member (5) for movement relative to the first body member (5). A catch mechanism (8, 11, 12) is also provided which is movable between the first position where the lock member (10) is fixed and the second position where the lock member (10) is released. The reciprocal member (6) moves in a first direction when a force is applied to the reciprocal member (6) and moves in a second direction when the force is removed. Repeated reciprocal movement of the reciprocal member (6) in the first and second directions effects movement of the catch mechanism (8, 11, 12) from the first position to the second position to release the lock member (10) to permit relative movement between the first and second body members (5, 1).

8 Claims, 5 Drawing Sheets

RELEASE MECHANISM

The invention relates to a release mechanism and especially a release mechanism for use in a well.

BACKGROUND OF THE INVENTION

In the oil and gas recovery industry there are many operations that are done to a well during its lifetime. All oil or gas wells have equipment associated therein which requires regular maintenance. To carry out this maintenance, "plugs" have to be installed at various depths in the well by wireline operations to make the well safe.

All plugs have to be designed to hold pressure differentials in both directions, firstly pressure from below, that is well build up pressure, and secondly pressure from above, that is equipment above the plug, will be pressure tested by pressurizing against the plug. It is essential however that the pressure is equalized around the plug prior to retrieving the plug. To accomplish this equalization, conventional plugs require a wireline run in the well to manipulate the plug's "equalization device". Once equalized a second wireline run is required to retrieve the plug.

One attempt at overcoming the problem of having to make two wireline runs has been to incorporate a shear pin into the internal mechanism of the plug so that when the pressure on the upper section of the plug is for example, 200 psi greater than the pressure below the plug the shear pin breaks and the mechanism is released to enable equalization to take place. However, this solution has the problem that there are very wide tolerance margins in the shear pins which means that it may be necessary to use a pressure differential which is substantially greater than 200 psi in order to shear the pin. In addition, in order to shear the pin it may be necessary to exceed the safe working pressure of the well pipe and christmas tree located above the plug. This is often the case especially if the seals on the christmas tree and well pipe have been tested to their operational maximum limit and this is similar to the well build up pressure below the plug.

A further problem with the shear pin mechanism may occur if a live well is plugged deep with such a mechanism while drilling another well. If the well being drilled accidentally breaches the plugged well, drilling mud will enter the plugged well above the plug. The weight of the drilling plug falling onto the plug with a shear pin mechanism in the live well could be sufficient to shear the pin accidentally. Clearly such a situation is undesirable during drilling as the pressure below the plug is released into both wells when the pin shears.

SUMMARY OF THE INVENTION

In accordance with the present invention, a release mechanism for releasing a lock member securing a first body member to a second body member, comprises a reciprocal member mounted on the first body member for movement relative to the first body member and a catch mechanism movable between a first position where the lock member is fixed and a second position where the lock member is released, the reciprocal member moving in a first direction when a force is applied to the reciprocal member, and moving in a second direction when the force is removed, and wherein repeated reciprocal movement of the reciprocal member in the first and second directions effects movement of the catch mechanism from the first position to the second position to release the lock member to permit relative movement between the first and second body members.

The invention has the advantage that the first body member is released from the second body member by repeated reciprocal movement of the reciprocal member.

Preferably, the release mechanism further comprises biasing means which biases the reciprocal member in the second direction so that when the force is removed the reciprocal member is biased to move in the second direction. Typically, the biasing means is adjustable and may for example comprise a bellville spring stack and the adjustability may be provided by increasing or decreasing the size of the spring stack.

Typically, the catch mechanism comprises at least one rachet mechanism coupled between the reciprocal member and one of the first and second body members and preferably, there are two rachet mechanisms to couple the reciprocal member to one of the first and second body members.

Typically, one rachet mechanism allows movement in the first direction and grips in the second direction and the other rachet mechanism grips in the first direction and allows movement in the second direction.

Preferably, the catch mechanism further comprises a catch member coupled between the rachet mechanisms and the catch member moves in either the first direction or the second direction in response to movement of the reciprocal member in the first or the second direction and remains stationary with respect to the first and second body members when the reciprocal member moves in the other direction.

Typically, a pre-determined number of reciprocal movements of the reciprocal member cause the catch mechanism to release the lock member.

Typically, after the predetermined number of reciprocal movements of the reciprocal member, the catch member has moved to a release position in which the lock member is released.

Preferably, the lock member is mounted in one of the first and second body members and engages a shoulder on the other of the first and second body members when the catch member is not in the release position. Typically, when the catch member is in the release position the lock member may move out of engagement with the shoulder on the other of the first and second body members.

Typically, the first and second body members when secured to each other by the lock member isolate a first section of a fluid passageway from a second section of a fluid passageway and typically, the force applied to the reciprocal member is applied by increasing the pressure of fluid within one section of the fluid passageway. Typically, relative movement between the first and second body members after the lock member has been released enables fluid in the two sections to communicate. This enables the fluid pressure in the first section of the fluid passageway to equalize with the fluid pressure in the second section of the fluid passageway.

Typically, the first and second body members are cylindrical and one body member is mounted within the other body member.

Preferably, one of the body members has a fluid port therein and the other body member closes the fluid port when the first body member is secured to the second body member by the lock member and the fluid port is opened when the lock member is released and the first and second body members move relative to each other. Preferably, the fluid passageway is a well, such as an oil or gas well. However, the fluid passageway could be a pipeline or any other passageway used for the transfer of fluid.

Preferably, the release mechanism is incorporated into a plug which may be located in a well to isolate a lower section of the well from an upper section of the well.

BRIEF DESCRIPTION OF THE DRAWINGS

Examples of a release mechanism in accordance with the invention will now be described with reference to the accompanying drawings, in which.

DESCRIPTION OF PREFERRED EMBODIMENTS

Figure 1:
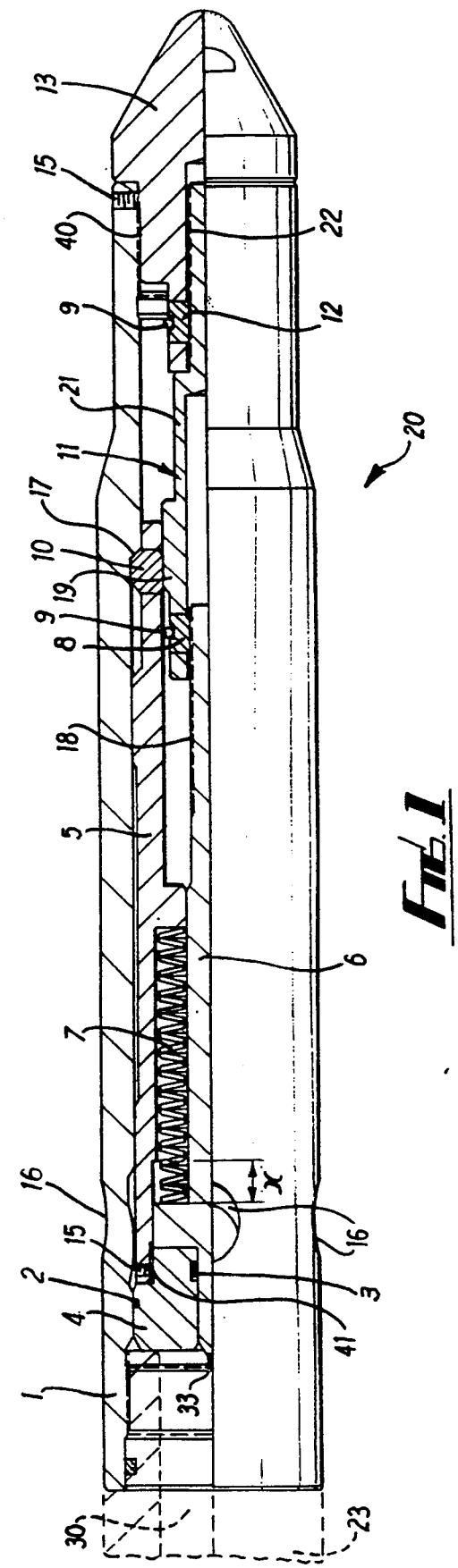
FIG. 1 is a partial cross section of a first example of a plug for use in an oil or gas well.

FIG. 1 shows a plug 20 suitable for using in an oil or gas well and which is designed to hold pressure differentials in both directions. The plug 20 has a main body 1 and a bottom sub 13 connected by a screw thread connection 40 to one end of the main body 1 and secured to the main body 1 by a grub screw 15. The main body 1 also has four flow ports 16 which enable fluid to flow from the outside of the main body 1 to the interior of the main body 1. Mounted on the main body 1 is an inner body 5 which is connected at one end by a screw thread 41 to a cap 4 also mounted within the main body 1. The cap is secured to the inner body 5 by a grub screw 15. At the other end of the inner body 5 are located a number of trip keys 10 (only one shown) which engage with a shoulder 17 on the inside on the main body 1.

Mounted within the cap 4 and the inner body 5 is a reciprocator shaft 6. A bellville spring stack 7 is mounted between the inner body 5 and the reciprocator shaft 6 and biases the reciprocator shaft 6 to the position shown in FIG. 1. Located at the other end of the reciprocator shaft 6 is a buttress thread 18 which engages with a rachet 8 which is located at one end of a release mandrel 11. The rachet 8 has a rachet spring ring 9 which maintains the rachet 8 in engagement with the buttress thread 18. The release mandrel 11 also has a thrust section 19 which, in the position shown in FIG. 1 forces the trip keys 10 into engagement with the shoulder 17 in the main body 1. The release mandrel 11 also has a recessed section 21 and at the end opposite the end with the rachet 8 has a buttress thread 22 which engages with a rachet 12 mounted on the bottom sub 13. The rachet 12 also has a spring ring 9 which holds the rachet 12 in engagement with the buttress thread 22.

Figure 2:
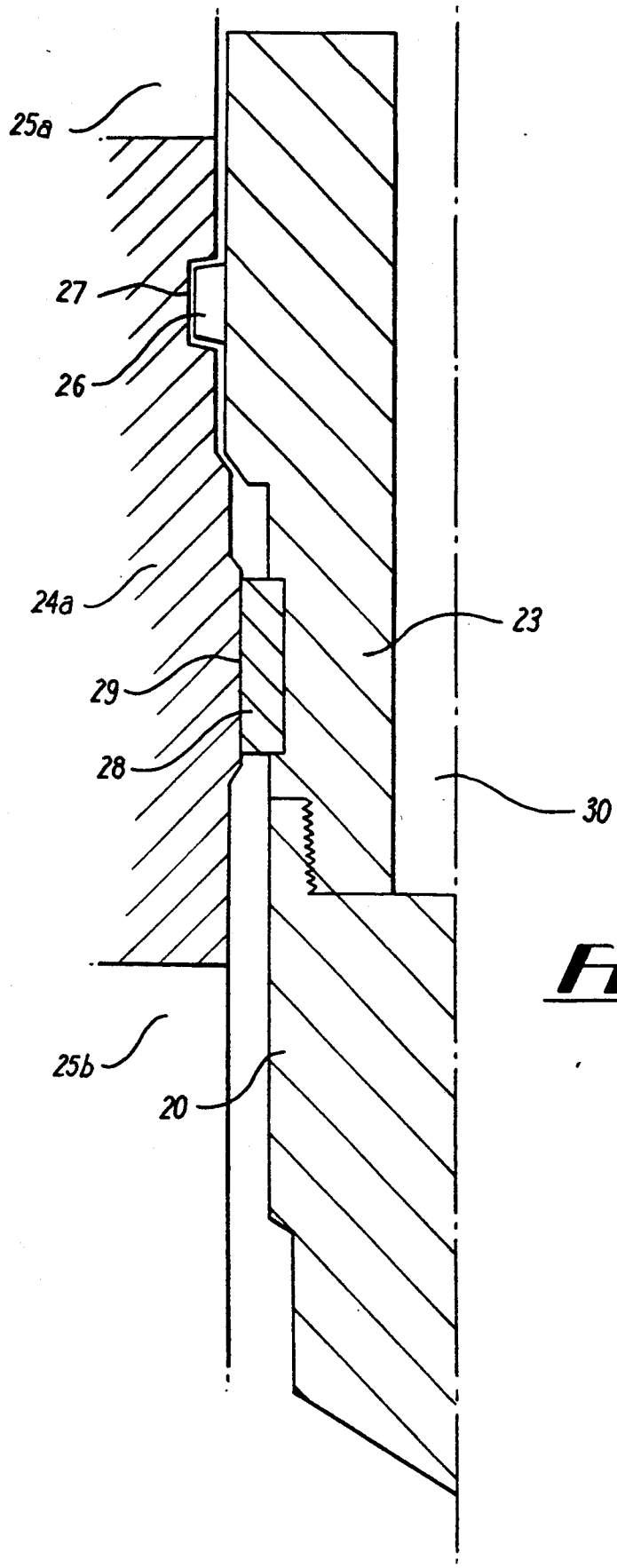
FIG. 2 is a schematic view of how the plug shown in FIG. 1 may be used to isolate a lower section of the well from an upper section.

In addition, two O-ring seals 2,3 seal the cap 4 with respect to the main body 1 and the cap 4 to the reciprocator shaft 6 respectively. At the other end of the main body 1 to the end with the bottom sub 13 is connected a lock 23 which is shown in phantom in FIG. 1. FIG. 2 shows the plug 20 connected to the lock 23. The lock 23 is engaged with a landing nipple 24a which is connected between two sections of pipe 25a, 25b in an oil or gas well. As can be seen in FIG. 2, the lock 23 has a lock element 26 which engages with a corresponding recess 27 in the landing nipple 24a to lock the lock 23 and plug 20 in position within the landing nipple 24a.

The lock 23 also has a set of seals 28 which engage with a corresponding sealing surface 29 on the landing nipple 24a. The plug 20 seals a through bore 30 in the lock 23. Hence, the combination of the plug 20 and the seals 28 isolates the upper section of drill pipe 25a from the lower section 25b.

Figure 3:
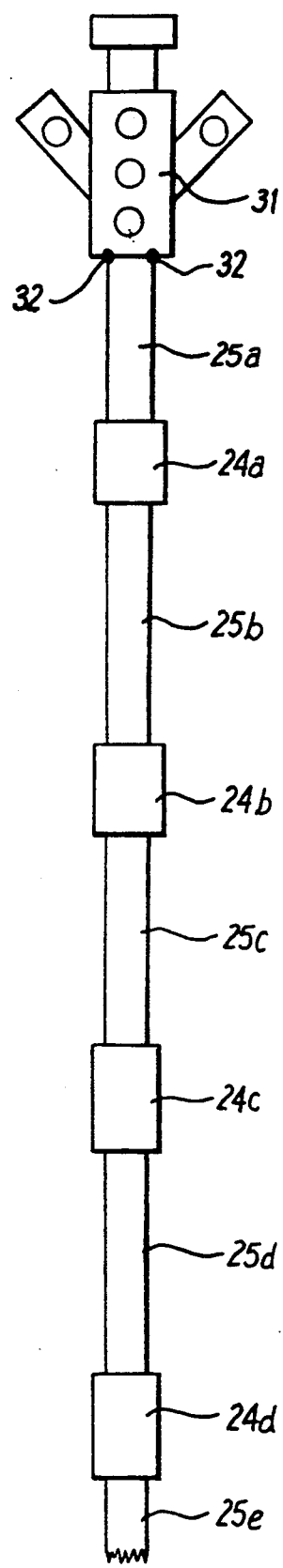
FIG. 3 is a schematic diagram showing one application of the apparatus shown in FIG. 1.

FIG. 3 shows a typical production well which has a number of pipe sections 25a to 25e which are separated by landing nipples 24a to 24d. At the top of the pipe section 25a is a christmas tree 31 from which the oil or gas produced by the well is extracted. During the lifetime of the well it may be necessary to replace the christmas tree 31 and/or to pressure test seals 32 which connect the christmas tree 31 to the upper pipe 25a. In order to do this it is necessary to block the well at a lower point to contain the pressure in the well which may be as high as 10,000 psi but which is normally around 5,000 psi.

To seal the well the plug 20 is connected to the end of the lock 23 and the lock 23 and plug 20 are dropped into the well by a wireline operation so that the lock elements 26 on the lock 23 engage with the lock recess 27 in one of the landing nipples 24a to 24d. For the purposes of this example it is assumed that the lock 23 is engaged with landing nipple 24a. When the lock 23 and plug 20 are in position the plug 20 and seals 28 isolate the upper section 25a of the well from the lower section 25b and the pressure in the upper section 25a of the well can be released to enable the christmas tree 31 to be removed from the upper section 25a.

When the christmas tree 31 is replaced on the section 25a the seals 32 must be checked in order to ensure that they do not leak and normally this is done by pumping sea water into the upper section 25a of the well, above the lock 23 and plug 20, up to the working pressure of the well. When the upper section 25a of the well is pumped up to working pressure the pressure of the sea water within the upper section of the well 25a will exert a pressure on an end surface 33 or the reciprocal shaft 6 in the plug 20. This causes the reciprocal shaft 6 to move a distance x (see FIG. 1) against the action of the bellville spring stack 7 which in turn causes the buttress thread 18 to move a distance x relative to the rachet 8. When the pressure 16 within the upper section of the well 25a is released the reciprocator shaft 6 will return to the position shown in FIG. 1 and the buttress thread 22 will be moved relative to the rachet 12 by the distance x, and the rachet 8 will grip the buttress thread 18 to prevent relative movement between the reciprocator shaft 6 and the release mandrel 11. Hence, the thrust section 19 of the release mandrel 11 moves relative to the trip key 10 by the distance x.

After the pressure testing of the seals 32 has been completed the thrust section 19 of the release mandrel 11 will have moved relative to the trip key 10 due to the action on the rachets 8,12 on the buttress threads 18,22 respectively. However, the thrust section 19 will still be in engagement with the trip key 10 to maintain the trip key 10 against the shoulder 17 in the main body 1.

In order to remove the lock 23 and plug 20 from the landing nipple 24a it is first necessary to allow the well to equalize the pressure between the two pipe sections 25a and 25b. If this is not done then when the lock elements 26 are released the lock 23 and plug 20 will be forced up the well by the pressure in the pipe section 25b and due to the high pressures within the pipe section 25b this is of course very dangerous. Hence, in order to equalize the pressure between the pipe sections 25a and 25b in order to enable the lock 23 and plug 20 to be safely removed from the landing nipple 24a pressure in the upper section 25a is increased and decreased repeatedly in order to obtain reciprocal movement of the reciprocator shaft 6 which draws the release mandrel 11 to the left, as shown in FIG. 1. When the release mandrel 11 has been drawn far enough to the left the thrust section 19 will have moved to the left of the trip key 10 and so the trip key 10 may move in to the recessed section 21 of the release mandrel 11. This takes the trip key 10 out of engagement with the shoulder 17 and permits the inner body 5 to move towards the bottom sub 13 of the plug 20. This permits the flow ports 16 to communicate with the through bore 30 in the lock 23 which enables fluid in the pipe section 25b to communicate with fluid in the pipe section 25a in order to enable the pressure to be equalized across the pipe sections 25a, 25b.

When the pressures have been equalized the lock 23 and plug 20 can be removed by a wireline operation in a conventional manner.

As the equalization mechanism of the plug 20 relies on movement in response to pressure it can be seen that pressure less than the maximum operating pressure of the section 25a, christmas tree 31 and the seals 32 can be used to operate the equalization mechanism. This avoids the need to either exceed the safe working pressure of these components and also avoids the need for two wireline operations, one operation to operate the equalization mechanism and the second operation to retrieve the lock 23 and plug 20 after equalization has taken place.

It can be seen that the mechanism disclosed here can be easily designed so that the equalization mechanism will trigger after the predetermined number of pressure cycles by for example choosing an appropriate distance x with respect to the length of the thrust section 19 on the release mandrel 11 or by varying the size of the bellville spring stack 7 so that, for example, at low pressure the reciprocator shaft 6 does not travel the full distance x.

As can be seen some of the advantageous features of the release mechanism in the plug 20 is that it enables high pressure tests to be carried out above the lock 23 and plug 20 but enables the flow port 16 to be opened by using a relatively low pressure. It is also possible to adjust the size and frequency of the pressure cycles necessary to open the flow ports and when the flow ports are opened there is a large flow of area.

Figure 4:
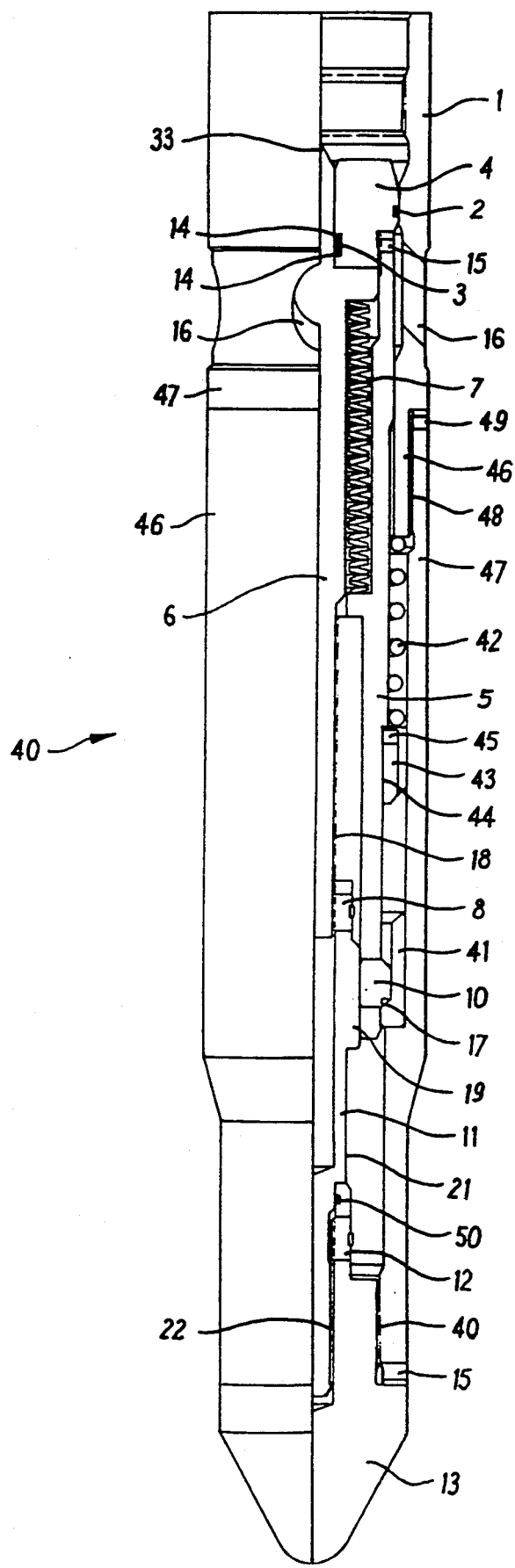
FIG. 4 is a partial cross-sectional view through a second example of a plug; and, FIG. 5 is a partial cross-sectional view through a third example of a plug.
Figure 5:
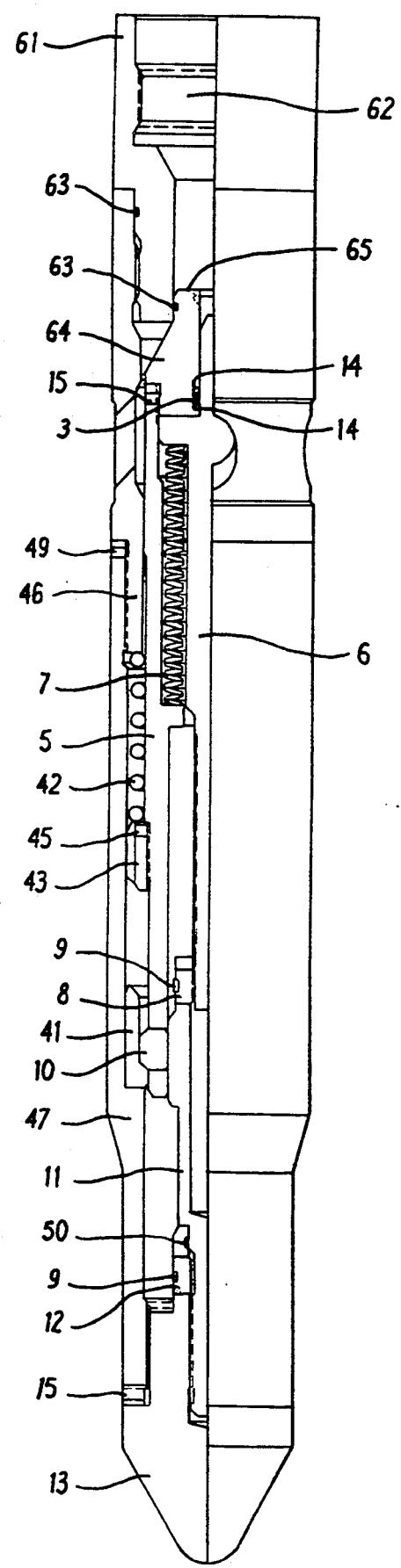

FIGS. 4 and 5 show two additional examples of plugs 40, 50 for use in an oil or gas well. FIG. 4 shows a plug 40 which is similar to the plug 20 but which has a number of modifications. Components which are similar to the components of the plug 20 have the same reference numerals as used in FIG. 1.

In the plug 40, the inner body 5 has a thread 44 on its outside surface and a threaded spring retainer ring 43 is threaded onto the thread 44. In addition, the main body 1 is formed from two sections 46, 47 which are interconnected by a thread 48 and secured by a grub screw 49. A helical spring 42 is located in the annular gap between the inner body 5 and the outer body section 47 and is compressed between the spring retainer ring 43 and an end of the body section 46. The helical spring 42 aids movement of the inner body 5 towards the bottom sub 13 when the trip key 10 moves out of engagement with the shoulder 17. In the plug 40 the shoulder 17 is formed on a removable insert 41 and this reduces the likelihood of damage occurring to the body section 47 and also makes the shoulder 17 easier to machine.

In addition, a shock absorbing 0-ring 50 is located between the bottom sub 13 and the release mandrel 11. The 0-ring 50 helps absorb jarring shocks applied to the plug 40 when jarring operations are used to set the plug 40 in the oil or gas well.

The plug 60 shown in FIG .5 is similar to the plug shown in FIG. 4 and similar sections have been indicated using the same reference numerals.

The main difference between the plug 40 in FIG. 4 and the plug 60 in FIG. 5 is that the plug 60 has an adaptor 61 attached to its top end where the lock 23 would normally be connected to the plugs 20, 40. In this example the lock 23 would be connected onto the adaptor 61 by means of the thread 62. 0-rings 63 seal the adaptor 61 to the upper body section 46 of the plug 60 and to a cap 64. The cap 64 is attached to the body section 5 in a similar manner as the cap 4 is attached to the body section 5 in the plugs 20, 40. However, the cap 64 differs from the cap 4 in that it has a reduced top surface area 65.

Hence, if the same pressure is applied to the end surface 65 as is applied to the end of the caps 4 in the plugs 20, 40 then the total force applied to the surface 65 of the end cap 64 will be less due to the reduced surface area. This makes the plug 60 ideal for use in positive pressure situations, that is in situations where it is desirable to maintain a higher pressure in the well above the plug 60 and below the plug 60.

Modifications and improvements may be incorporated without departing from the scope of the invention.

I claim:

1. A plug for coupling to a landing nipple in a well, the plug isolating an upper section of the well from a lower section of the well when coupled to the landing nipple, the plug comprising:
  a first body member;
  a second body member;
  a lock member securing said first body member to said second body member in a first position; and
  a release mechanism for releasing said lock member, said release mechanism comprising:
    a reciprocal member mounted on said first body member for movement relative to said first body member; and
    a catch mechanism movable between a first position in which said lock member is fixed and a second position in which said lock member is released;
    means responsive to a force on said reciprocal member for moving said reciprocal member in a first direction when a force is applied thereto;
    means for moving said reciprocal member in a second direction when the force is removed; and, means responsive to repeated reciprocal movement of said reciprocal member in said first and second directions for effecting movement of said catch mechanism from the first position to the second position to release said lock member to permit relative movement between said first and second body members.

2. A plug according to claim 1, wherein said means for moving said reciprocal member in the second direction comprises biasing means to bias said reciprocal member in the second direction.

3. A plug according to claim 1 or claim 2, wherein the catch mechanism comprises at least one ratchet mechanism coupled between the reciprocal member and one of the first and second body members.

4. A plug according to claim 3, wherein there are two ratchet mechanisms to couple the reciprocal member to one of the first and second body members.

5. A plug according to claim 4, wherein one ratchet mechanism permits movement in the first direction and grips in the second direction and the other ratchet mechanism grips in the first direction and permits movement in the second direction.

6. A plug according to claim 4, wherein the catch mechanism further comprises a catch member coupled between the ratchet mechanisms and the catch member moves in either the first or the second direction in response to movement of the reciprocal member in the first or the second direction and the catch member remains stationary with respect to the first and second body members when the reciprocal member moves in the other direction.

7. A plug according to claim 1 wherein one body member is mounted within the other body member.

8. A plug according to claim 1, wherein one of the body members has a fluid port therein and the other body member closes the fluid port when the first body member is secured to the second body member by the lock member and the fluid port is opened when the lock member is released and the first and second body members move relative to each other.

* * * * *